(12) United States Patent
Fleckenstein

(10) Patent No.: US 6,273,662 B1
(45) Date of Patent: Aug. 14, 2001

(54) LIFTING DEVICE

(76) Inventor: Mark A. Fleckenstein, 6769 N. FM 51, Decatur, TX (US) 76234

(*) Notice: Subject to any disclaimer, the term of this patent is extended or adjusted under 35 U.S.C. 154(b) by 0 days.

(21) Appl. No.: 09/651,864

(22) Filed: Aug. 31, 2000

(51) Int. Cl.$^7$ .................................................. E04G 21/16
(52) U.S. Cl. ........................................... 414/11; 248/371
(58) Field of Search ............................... 414/11; 248/371

(56) References Cited

U.S. PATENT DOCUMENTS

| | | | |
|---|---|---|---|
| 3,058,602 | * 10/1962 | Kilman | 414/11 |
| 3,735,958 | 5/1973 | Hollingsworth | 254/2 R |
| 4,188,007 | 2/1980 | Ubezio | 248/411 |
| 4,300,751 | * 11/1981 | Delaney | 414/11 X |
| 4,502,568 | 3/1985 | Lebre | 187/9 R |
| 4,560,031 | * 12/1985 | Dixon et al. | 414/11 X |
| 4,921,385 | 5/1990 | Okuno | 414/21 |
| 4,955,592 | 9/1990 | Brennan, Sr. | 269/68 |
| 5,173,002 | 12/1992 | Brennan, Sr. | 403/388 |
| 5,275,390 | 1/1994 | Brennan | 269/68 |
| 5,322,403 | * 6/1994 | Herde | 414/11 |
| 5,975,495 | 11/1999 | Berends et al. | 254/2 B |
| 5,992,824 | 11/1999 | Voss | 254/2 B |

FOREIGN PATENT DOCUMENTS

2538437 * 6/1984 (FR) .................................... 414/11

* cited by examiner

*Primary Examiner*—Janice L. Krizek
(74) *Attorney, Agent, or Firm*—Lee, Mann, Smith, McWilliams, Sweeney and Ohlson

(57) ABSTRACT

The invention is directed to a lifting device that can be used to lift, support and align articles such as cabinets, counter tops, shelving and the like during installation and removal. The lifting device includes a base, a hydraulic ram assembly, an adjustable L-shaped bracket assembly and an adjustable platform. The lifting device has a height adjustable range from thirteen inches to eight feet and is adapted to allow the load to be positioned directly over the lift or offset if an extended outward reach is needed. The adjustable platform is designed to allow the lifted article to be pivoted in multiple axes of rotation thereby allowing precision alignment of the cabinet with respect to the wall to which it is to be secured prior to installation.

12 Claims, 3 Drawing Sheets

LIFTING DEVICE

BACKGROUND OF THE INVENTION

This invention may be described as a lifting device that can be used to lift and support articles such as cabinets, counter tops, shelving and the like during installation or removal which provides greater adjustability, support and maneuverability over conventional devices reducing the time and effort required during installation.

DESCRIPTION OF RELATED ART

During the construction or remodeling of kitchens, bathrooms, offices, entertainment centers and conference rooms in residential and commercial structures, lift and support devices are used to aid in the installation of articles such as cabinets and counter tops. Installation of cabinets typically requires them to be mounted to walls as units or as a series of interconnected cabinets. Removal of existing cabinets usually requires support of the cabinets while the fastening mechanisms are removed. To attach a cabinet to a wall, it is necessary to incorporate a device to support the cabinet while it is fastened. A typical device used to install wall cabinets is a T-shaped support fabricated from lumber stock wherein the vertical member is cut to a height equal to the elevation at which the cabinet is to be installed. These onsite constructed supports work best when the cabinet is installed against a soffit and the cabinet can be wedged between the support and a soffit to securely hold the cabinet in place. When a soffit is not used, these devices are relatively unstable for supporting a cabinet and require two people to install the cabinet. Also, it is not uncommon during the installation of cabinets in new construction or during remodeling of an existing structure to encounter a room that has walls that are not square or a floor that is not level, rendering it difficult to install cabinets so they appear plumb. When installing cabinets in rooms of this sort, it is desirable to align the cabinets by placing shims between the wall and the cabinet so that they are horizontal and plumb even though the walls are not. Previous devices used to support cabinets during installation do not have the adjustment capability to adequately raise and level the cabinet. Typically, shims need to be placed between the cabinet and the lift device in order to maneuver the cabinet into the proper position so it can be fastened to the wall. These types of adjustments are time consuming causing delay in the completion of the installation. Also, prior devices do not have the adjustable range of height needed to cover the different aspects of cabinet installation. Furthermore, the prior art devices do not have the ability to elevate an existing counter top while the base cabinets beneath are replaced. Typically, several different devices need to be used to allow the completion of the installation since the range of adjustability is limited. The present invention has the ability to lift a cabinet to a desired height with an adjustment range from 13 inches to 8 feet and allows for the precise adjustment of the cabinet to allow proper fastening and remains stable even when cabinets are raised to higher elevations.

SUMMARY OF THE INVENTION

The present invention provides a lifting and adjustable positioning device for supporting an article such as a cabinet or counter top and allows for precise adjustment so the cabinet can be properly fastened to a wall. The lifting device consists of a base, a vertically extendable shaft, an adjustable L-shaped bracket assembly and an adjustable platform. The vertical shaft assembly is supported by the base which includes four outwardly extending legs equipped with locking casters. The hydraulic adjustment portion of the vertical shaft consists of a base portion and a telescoping shaft. The shaft is telescopically raised by the use of a foot operated hydraulic pump mechanism which incrementally raises the extending portion of the jack with each press of the pedal. To lower the jack, a release knob releases the hydraulic pressure thereby lowering the lift.

The adjustable L-shaped bracket assembly consists of a one piece L-shaped rectangular bracket with a long leg and a short leg. The long leg has apertures placed along its length to allow for multiple position attachment to the telescoping shaft. To adjust the bracket assembly, two bolts are removed from the bracket allowing it to be raised or lowered to the desired height.

The adjustable platform supports the cabinet and has a central pivot and two height adjustment mechanisms that aid in leveling the cabinet prior to installation. The jack has a height adjustment range from 13 inches to 8 feet and allows a cabinet to be pivoted in three axes of rotation.

DETAILED DESCRIPTION OF THE INVENTION

While the present invention will be described fully hereinafter with reference to the accompanying drawings, in which a particular embodiment is shown, it is understood at the outset that persons skilled in the art may modify the invention herein described while still achieving the desired result of his invention. Accordingly, the description which follows is to be understood as a broad informative disclosure directed to persons skilled in the appropriate arts and not as limitations of the present invention.

Figure 1:
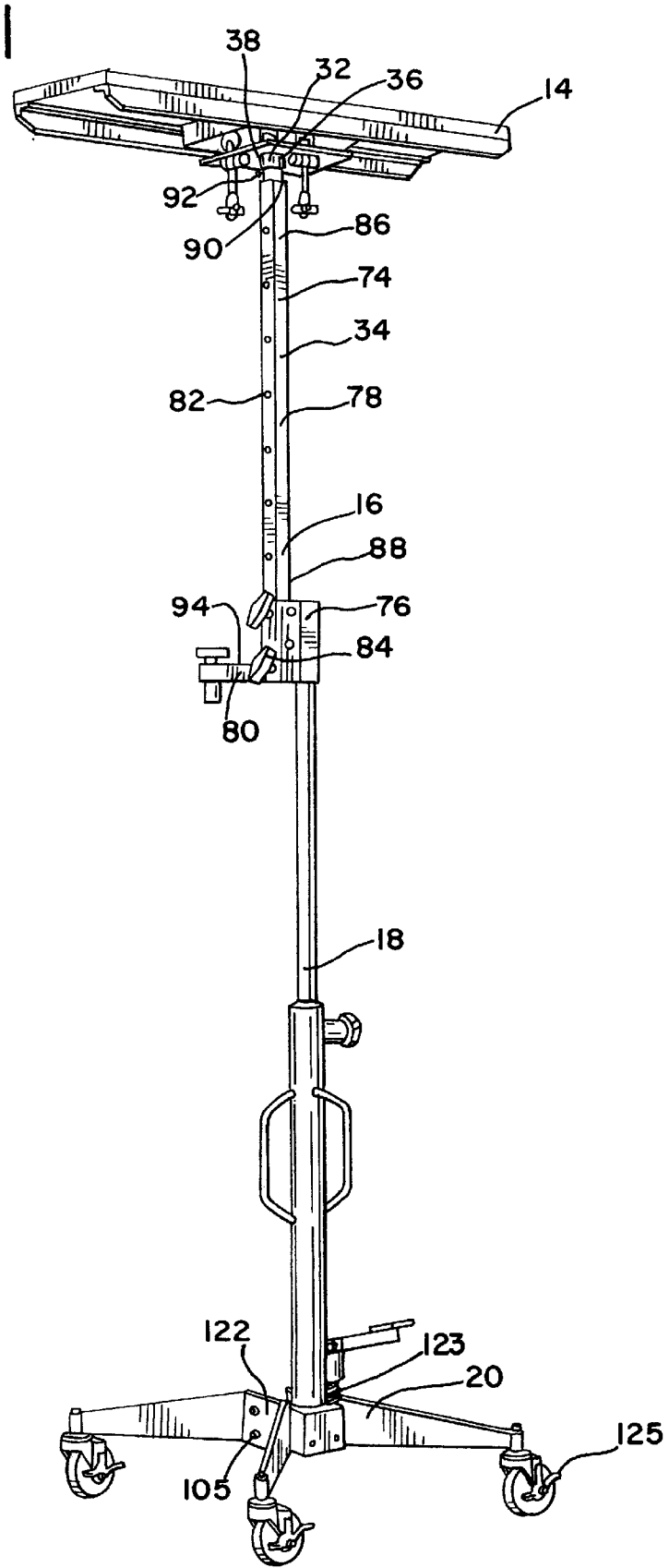
FIG. 1 is a perspective view of the lifting device according to the present invention shown with the telescoping shaft and L-shaped bracket fully extended.

A preferred embodiment of the lift device 10 is shown in FIG. 1 with a hydraulic lift portion fully extended. The lift device 10 is adapted to support an article such as a cabinet or counter top which is to be installed during new construction or remodeling. The lift device 10 supports the article on an adjustable platform 14 to assist in the placement of the article. The platform 14 can be raised, lowered, tilted and pivoted to allow for alignment of the article so that it can be properly secured to a wall or other structure.

Figure 5:
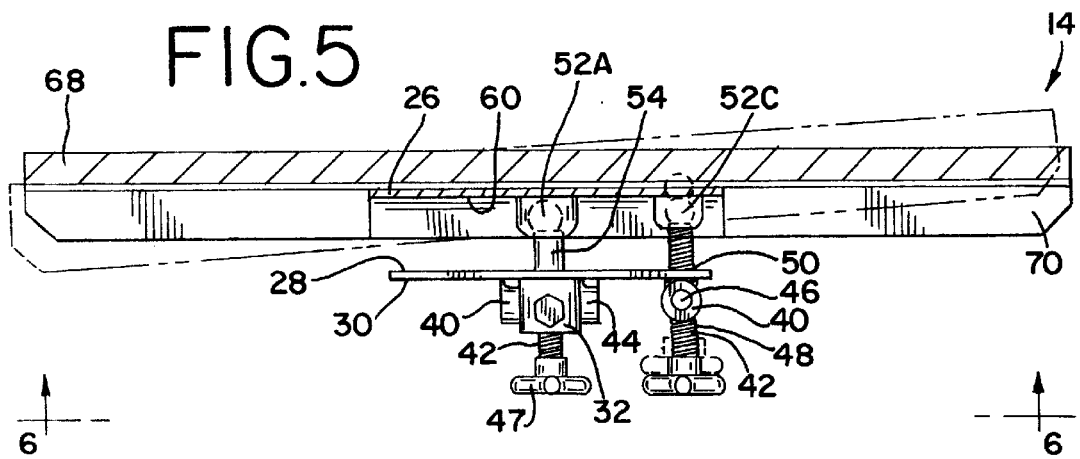
FIG. 5 is a front elevational view of the platform and adjustment mechanism.
Figure 6:
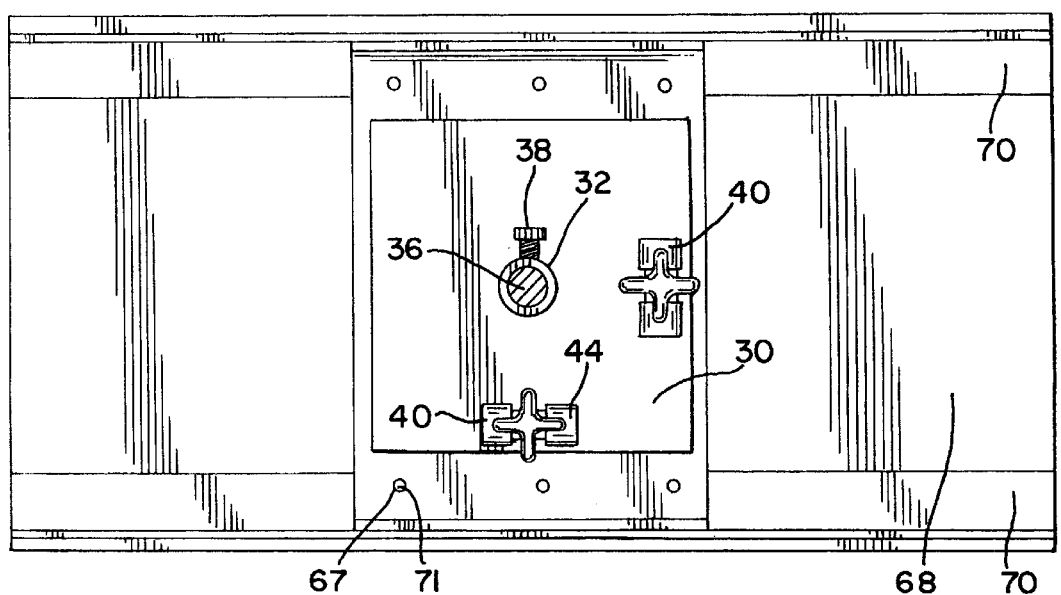
FIG. 6 is a bottom view of the platform and adjustment mechanism.

The lifting device 10 includes the adjustable platform 14, an adjustable L-shaped bracket assembly 16, a vertically extendible shaft 18, and a base member 20. The vertically extendible shaft 18 is illustrated in the preferred embodiment as a hydraulic ram assembly. Other vertically extendable mechanisms could be utilized or substituted such as mechanisms which are electrically or pneumatically actuated or those which are mechanical in nature. The adjustable platform 14, shown best in FIGS. 4–6, includes an adjustment mechanism 22 which consists of a bottom plate 24 and a pivotally attached top plate 26. The bottom plate 24 is illustrated as being rectangular in shape and has a top surface 28 and a bottom surface 30. The bottom surface 30, shown best in FIG. 6, includes a mount 32 centrally located to allow for attachment to an L-shaped bracket 34 shown in FIG. 1. The mount 32 is cylindrical in shape and includes a central aperture 36 and an attachment bolt 38 which is threadably engaged into the side of the mount 32, perpendicularly oriented to central aperture 36. The attachment bolt 38 allows the platform 14 to be secured to the L-shaped bracket 34. The bottom surface 30, shown in FIG. 5, further includes two toggle bolt assemblies 40 adapted to receive a threaded shaft 42. The toggle bolt assemblies 40 are attached along the midpoint of two edges on the bottom surface 30 and are oriented so that the toggles 40 pivot perpendicularly to the other. The toggle bolt assembly 40 is cylindrical in shape with two spaced apart collars 44 affixed to the bottom surface 30 of the bottom plate 24. A rotatable rod 46 with a threaded aperture 48 is rotatably connected to and located within the two collars 44. The rotatable rod 46 has an adjustment knob 47 affixed to one end. The threaded shaft 42 is connected to the threaded aperture 48 where it passes through an aperture 50 in the bottom plate 24 and connects with the top plate 26 at a ball and socket joint 52. The top surface 28 of the bottom plate 24 includes a centrally located upwardly extending shaft 54 that is affixed to the top surface 28 of the bottom plate 24 at a first end 56 and pivotally connected to the bottom surface 60 of the top plate 26 with the use of a ball and socket joint 52A.

Figure 4:
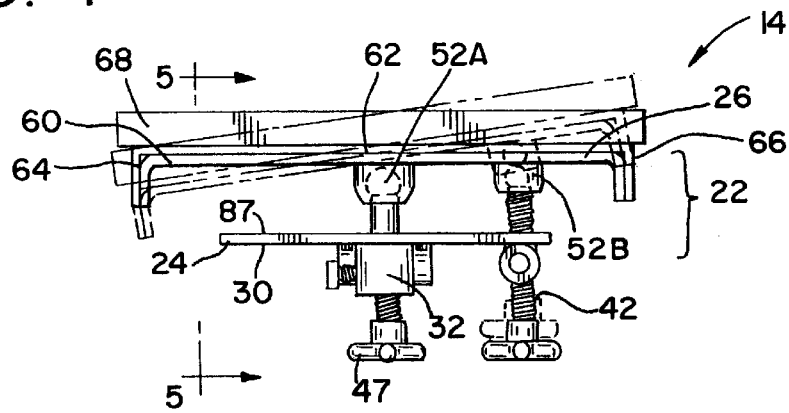
FIG. 4 is a side elevational view of the platform and adjustment mechanism.

The top plate 26, as shown in FIG. 4, has a bottom surface 60 and a top surface 62. The top plate 26 also includes a first side 64 and a spaced apart second side 66. The top surface 62 is flat and is adapted to receive a support shelf 68 which supports the article that is to be lifted. The bottom surface 60 includes a central ball and socket joint 52A that allows top plate 26 to pivot in multiple directions. The bottom surface 60 further includes two other ball and socket joints 52B and 52C, shown in FIGS. 4 and 5, located along the center points of two side edges. The top plate 26, shown in FIG. 6, also includes a plurality of apertures 67 to allow fasteners 71 to pass through for connection to the support shelf 68. The side edges 64 and 66 contain apertures (not shown) to allow attachment to a pair of angle irons 70 that run longitudinally down the length of the support shelf 68. The angle irons 70 are used to connect the shelf 68 to the side edges 64 and 66 of the top plate 26 to provide extra support to the support shelf 68 to prevent unwanted movement or flexing during lifting.

Figure 3:
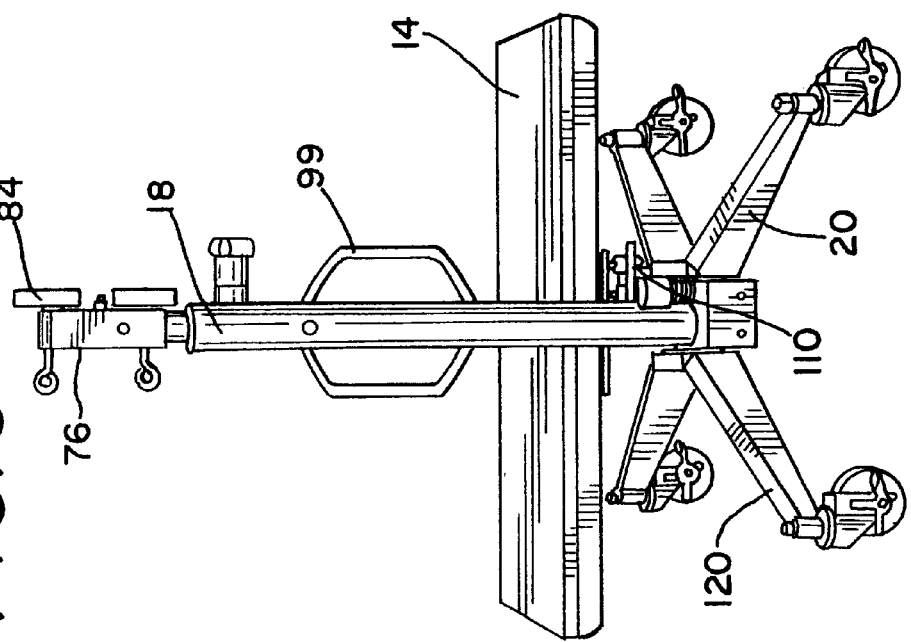
FIG. 3 is a perspective view of the lifting device with the telescoping shaft retracted and the L-shaped bracket in the normal position.

The adjustable L-shaped bracket assembly 16 is best illustrated in FIG. 1 and includes an L-shaped bracket 74 and a bracket mount 76. The bracket 74 includes a long leg 78 and a short leg 80. The long leg 78 is a tubular stricture and is illustrated as being 1 5 square in shape although other geometric shapes could be used. The long leg 78 contains a first end 86 a second end 88 and a plurality of spaced apart apertures 82 that pass through the leg 78 to allow for adjustable attachment to the bracket mount 76 with the use of fasteners 84. The long leg 78 also includes an aperture 90 at the tip of the first end 86 that accepts a fastener 92 to allow attachment to the platform mount 32. The L-shaped bracket 74 is to be positioned with respect to the vertically extendable shaft and platform before an article 12 is placed upon the platform 12. The short leg 80 of the bracket 74 contains apertures 94 to allow for a fastener 96 to pass through and connect with the central aperture 36 in the adjustable platform mount 32 and affixed with an attachment bolt 38. The different apertures 94 allow the load to be centered directly over the lift device 10 for more stable lifting force or offset to allow a longer outward reach if needed such as when installing wall cabinets over base cabinets that are already installed. To reach lower elevations, bracket 74 can be flipped 180 degrees so the short leg 80 is oriented as the lowest point on the bracket 74. In this position the lift device 10 can support an article 12 as low as thirteen inches above the surface of the floor, as shown in FIG. 3. To reach the higher elevations, the L-shaped bracket can remain with the short leg 80 near the bottom of the bracket mount 76 or inverted.

Figure 2:
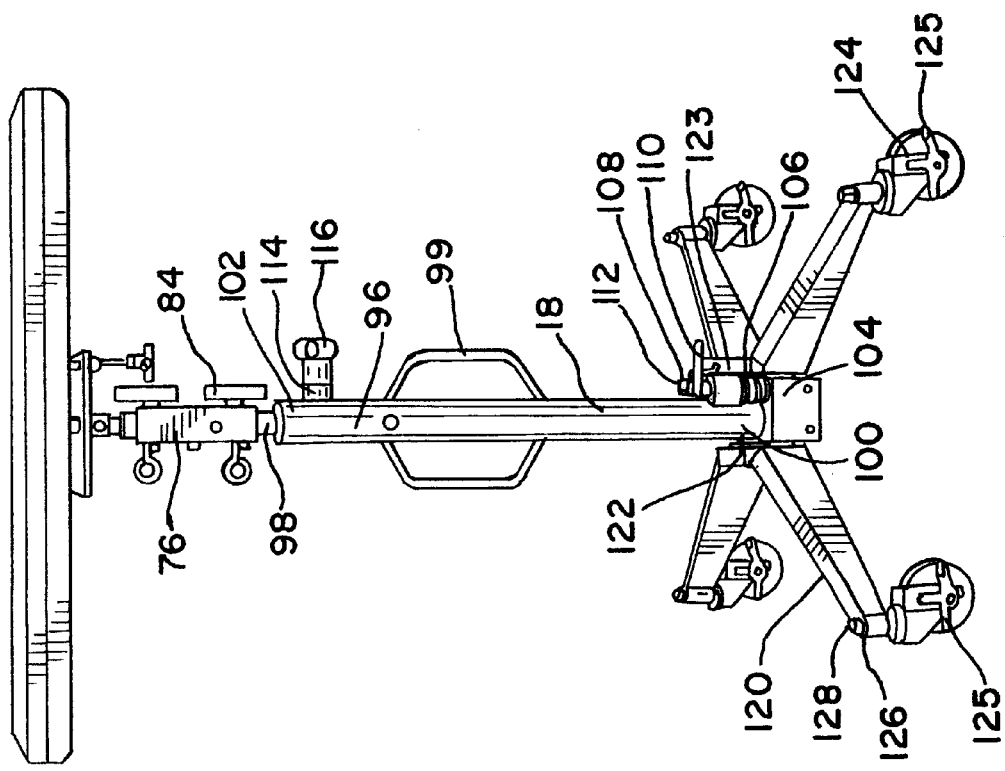
FIG. 2 is a perspective view of the lifting device with the telescoping shaft retracted and the L-shaped bracket in the inverted position.

The hydraulic ram assembly 18, as shown in FIG. 2, has a cylinder 96 and a vertically extendible shaft 98. The cylinder 96 has a first end 100 and a spaced apart second end 102. The cylinder 96 houses the telescoping shaft 98 that extends from the second end 102 when the pedal 110 is depressed. The telescoping shaft 98 is connected to the base portion 96 at one end and to the bracket mount 76 at the other end. The first end 100 includes a rectangular reservoir and pump assembly 104. The pump (not shown) is of standard construction and operation and is engaged by use of a spring biased shaft assembly 106 and a foot operated lever 108. The foot operated lever 108 is pivotally attached to the base portion 96 and includes a pedal 110 and a bushing 112 that engages the top of the shaft assembly 106. To raise the hydraulic ram 18, the pedal 110 is depressed which moves the lever 108 downward allowing the bushing 112 to depress the spring biased shaft assembly 106. Each press of the pedal 110 raises the shaft 98 an incremental amount to allow for fine height adjustment of the article 12 to be lifted. The second end 102 includes a hydraulic release valve 114 that is equipped with a knob 116 which when opened, releases the hydraulic pressure and allows the shaft 98 to retract into the cylindrical base 96. The cylinder portion also includes a pair of handles 99 that are attached to the outer surface to allow the lift device to be easily transported and positioned.

Alternatively, the hydraulic ram assembly 18 can be substituted with a pneumatically, electrically or mechanically operated device as known to those of ordinary skill in the art. The mechanical device could be gear or ratchet driven wherein gear teeth arc attached along the length of the telescoping shaft 98 which engage a rotary gear in the base portion that is attached to a crank handle or an electric motor. The lift assembly could also be raised pneumatically wherein the lift device 10 is attached to a compressed air supply. The compressed air would enter the base portion 96 by use of a foot or hand operated valve and raise a telescoping shaft to the desired height.

To stabilize the lift device 10, a support member 20 is attached to the bottom of the hydraulic ram assembly 18. The support member 20 consists of four or more radially outwardly extending legs 120 that are interconnected by a bridge member 122. At the end of each leg 120 is a rotatable locking caster 124 of standard construction adapted to allow the lift device 10 to be easily wheeled into position. The legs 120 are illustrated as being triangular in shape, with the widest portion connected to the bridge 122 and narrow as they extend outwardly. The legs 120 are arranged so that they are spaced apart at an angle of about 90 degrees with respect to each other. The ends of the casters include an aperture 126 that allow a fastener 128 to pass through and attach to the caster 124. The bridges 122 and 123 are connected to the rectangular reservoir and pump assembly 104 by the use of fasteners 105, shown in FIG. 1, that pass from one bridge 122, through the reservoir and pump assembly 104 to the other bridge 123. The casters 124 are of the type that can rotate about an axis and include a foot operated locking device 125 that when depressed, prevents the casters 124 from rolling.

The present design of the lift device 10 has a range of vertical motion from thirteen inches to eight feet however, this can be varied depending upon the dimensions of various parts. To achieve a load offset arrangement from the lift device 10, the L-shaped bracket 74 is attached to the bracket mount in an inverted "L" position as shown in FIG. 2. Without a load on the platform 14, the inverted L-shaped bracket 74 is attached to the bracket mount 76 with fasteners 84. At this point, an article, such as a cabinet can be placed upon the platform 14 and incrementally raised by repeatedly depressing the pedal 110 until the desired height is reached. To adjust the orientation of the cabinet, the angular inclination of the platform can be adjusted by rotating the adjustment knobs 47, located on the underside of the support platform adjustment mechanism 22, either clockwise or counterclockwise until the cabinet is properly aligned with the wall surface to which it is to be secured. The rotation of an adjustment knob 47 clockwise causes the threaded shaft 42 to apply a vertical upward pressure to the top plate 26 causing one half of the plate and platform 14 to raise and the other half to lower. Similarly, the other adjustment knob can be rotated clockwise or counterclockwise to raise or lower the platform. By rotating both knobs in the same direction, a corner of the platform can be lowered or raised to provide for multiple plane angular adjustment. Angular adjustments are necessary for proper cabinet positioning to compensate for walls that are not square and floors that are not level. The platform 14 can also rotate about its centrally located mount 32 to further enhance the adjustability of the cabinet so that it can be pivoted without the need to move the entire lift device 10. To reach a load centered height of 8 feet, as shown in FIG. 1, the adjustment mechanism 22 is detached from the L-shaped bracket. The L-shaped bracket 74 is then removed from the bracket mount 76 and rotated 180 degrees so that the bracket 74 is in the typical "L" configuration. The bracket 74 is reinstalled to the bracket mount 76 by attaching it at the lowest point of the long leg 78. The platform is then attached to the top of the long leg 78 and the cabinet is placed upon the platform. The load centered position increases the stability of the lift device which reduces the risk of the lift device 10 tipping over when heavier objects are lifted to greater heights. The load offset position is used when it is not possible to position the jack under the cabinet to be lifted due to an obstruction such as base cabinets and counter tops. To adjust the platform height to thirteen inches, the platform 14 is removed from the top of the long leg 78 and is connected with the short leg 80 of the L-shaped bracket 74. The long leg 78 is then released from the bracket mount 76 and moved to the lowest position. It is at this point in time where the cabinet can be placed upon the platform 14 and the hydraulic portion can be raised or lowered to incrementally adjust the position of the cabinet with respect to the wall. This position is useful for elevating existing counter tops when old cabinets are removed and new ones are installed beneath.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A lifting and adjustable positioning device for supporting an article, said device comprising:
    a base member;
    a shaft which is vertically extendable;
    an adjustable support platform adapted to be supported by said shaft and to support the article;
    a first adjustment mechanism associated with said platform adapted to vary the angular inclination of said platform from the horizontal about a first axis;
    a second adjustment mechanism associated with said platform also adapted to vary the angular inclination of said platform from the horizontal about a second axis; and
    a bracket adapted to interconnect said shaft and said support platform.

2. The lifting and adjustable positioning device of claim 1, wherein said second axis is substantially perpendicular to said first axis.

3. The lifting and adjustable positioning device of claim 1, including a third adjustment mechanism associated with said bracket adapted to vertically raise or lower said platform with respect to said shaft.

4. The lifting and adjustable positioning device of claim 1, including a support member having a plurality of outwardly extending legs to provide stability to said device when supporting an article.

5. The lifting and adjustable positioning device of claim 1, wherein said vertically extendable shaft is incrementally raised by the use of a manually operated foot pump and lowered by use of a manually operated release valve.

6. The lifting and adjustable positioning device of claim 1, in which said bracket is L-shaped and includes a first leg and a second leg perpendicular to said first leg, said first leg being longer than said second leg.

7. The lifting and adjustable positioning device of claim 6, wherein said L-shaped bracket is adjustably connected to a bracket mount, and said bracket mount is attached to said vertically extendable shaft.

8. The lifting and adjustable positioning device of claim 6, wherein said second leg contains a plurality of evenly spaced apertures to allow for multiple position attachment to said bracket mount with the use of fasteners.

9. The lifting and adjustable positioning device of claim 1, wherein said adjustable support platform includes a top plate and a bottom plate attached to said top plate by a central pivot and said first and second adjustment mechanisms.

10. The lifting and adjustable positioning device of claim 9, wherein each said first and second adjustment mechanisms include a toggle bolt attached to said bottom plate and a ball and socket joint attached to said upper plate, said toggle bolt and said ball and socket joint are adjustably connected to a threaded shaft.

11. The lifting and adjustable positioning device of claim 10, wherein said threaded shaft includes an adjustment knob at one end and a ball joint at the other end, said ball joint adapted to be pivotally received into said ball and socket joint.

12. A portable elevating and alignment device, comprising:
    a horizontal support including a first angular inclination adjustment mechanism to vary the angle of said horizontal support about a first axis;
    said horizontal support further including a second angular inclination adjustment mechanism to vary the angle of said horizontal support about a second axis;

a first adjustable elevating mechanism including a plurality of apertures to provide for multiple adjustment positions;

a second adjustable elevating mechanism;

a base member;

said first adjustable elevating mechanism interconnecting said horizontal support and said second adjustable elevating mechanism.

* * * * *